Dec. 19, 1933.  A. T. POTTER  1,940,322
HINGE CONSTRUCTION
Filed Oct. 10, 1930

INVENTOR
Albert T. Potter.
BY
Harness, Dickey, Pierce & Hann,
ATTORNEYS.

Patented Dec. 19, 1933

1,940,322

UNITED STATES PATENT OFFICE 1,940,322

HINGE CONSTRUCTION

Albert T. Potter, Detroit, Mich., assignor to Ainsworth Manufacturing Corporation, a corporation of Michigan Application October 10, 1930. Serial No. 487,727

9 Claims. (Cl. 296—92)

This invention relates to hinges particularly suitable for the upper edge of a motor vehicle windshield.

The main objects of this invention are to provide a hinge having complementary convolved portions whereby the use of a hinge pin is eliminated; to provide a hinge construction in which the cooperating hinge elements are continuous throughout their length; to provide a hinge construction having a triple seal which effectively makes it weather tight and water tight; to provide a hinge which is neat appearing, strong, substantial and compact and which has relatively few and simple parts; and to provide a hinge which is separable only by relative longitudinal movement and normally limited in hinged movement at both ends of a predetermined arc.

An illustrative embodiment of this invention is shown in the accompanying drawing, in which—

Figure 1:
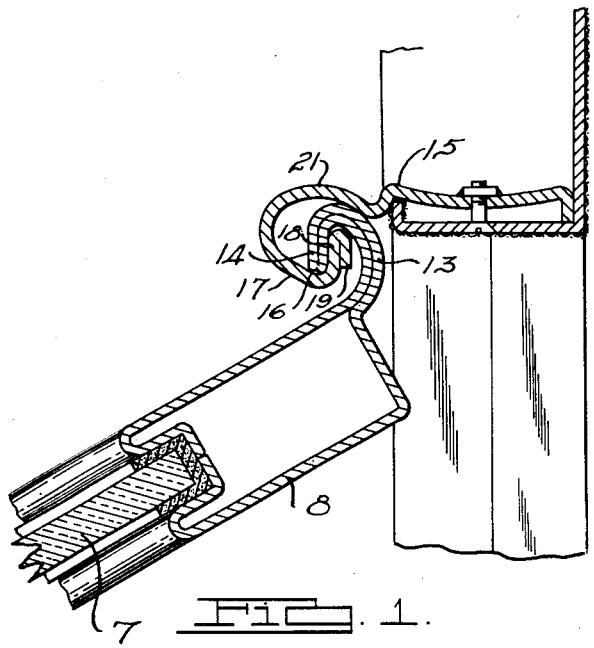
Fig. 1 is an enlarged, fragmentary, sectional view taken on the line 1—1 of Fig. 3, looking in the direction indicated, but with the windshield swung outwardly at the bottom.

In the construction shown in the drawing, a motor vehicle 6 is shown provided with a windshield 7 having a surrounding sheet metal frame 8 which embraces the marginal edge of the windshield glass in the usual manner.

The frame 8 is a made of sheet metal and the upper forward edge is doubled together and bent to provide the inner hinge element. This inner hinge element comprises a partially cylindrical pivot portion 9 formed on a radius, the center of which is located at 10. The element is formed to provide an arcuate portion 11 which has inner and outer bearing surfaces 12 and 13 respectively, in spaced relation and concentric to the center-point 10. A radially disposed substantially straight portion 14 extends from the pivot portion 9 to the arcuate portion 11.

The outer hinge element comprises a sheet metal member 15 formed to provide a semi-cylindrical socket 16 for the reception of the pivot portion 9, a pair of substantially straight portions 17 and 18 diverging from the socket 16, the relative angularity of which determines the arc of movement through which the inner hinge member may swing.

The outer terminating edge of the straight portion 18 is bent back upon itself, as shown at 19, to provide an arcuate bearing surface 20, which is adapted to slidingly engage the inner bearing surface 12 of the inner hinge element. The outer member also is formed to provided an arcuate portion 21 which provides an arcuate inner bearing surface 22 formed concentrically to the socket 16 for conforming to and slidingly engaging the outer bearing surface 13 of the inner hinge element.

The inner and outer hinge elements are formed so as to have snug sliding fit and contact with each other and an assembly is made by passing the inner element edgewise longitudinally into the outer element.

When assembled, the portion 20 slidably engages the inner bearing surface 12 at all positions, the pivot portion 9 rests in and pivots in the socket 16 and the bearing surface 22 fits snugly against and slidably engages the outer bearing surface 13 of the inner member, thus providing three points at which the hinge is sealed.

Figure 2:
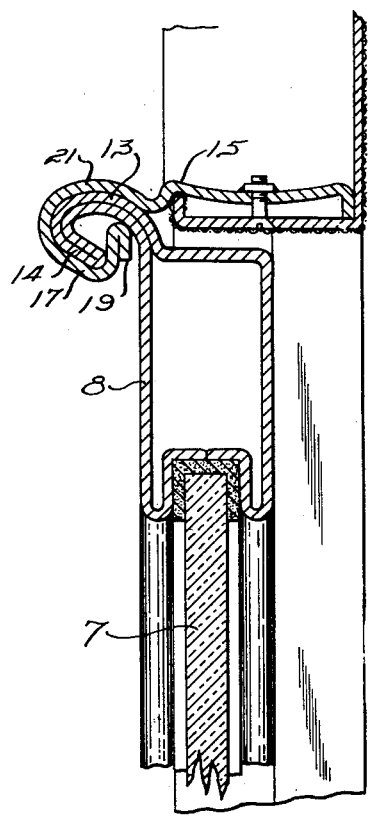
Fig. 2 is an enlarged, fragmentary, sectional view taken on the line 1—1 of Fig. 3 with the windshield in closed position as shown.
Figure 3:
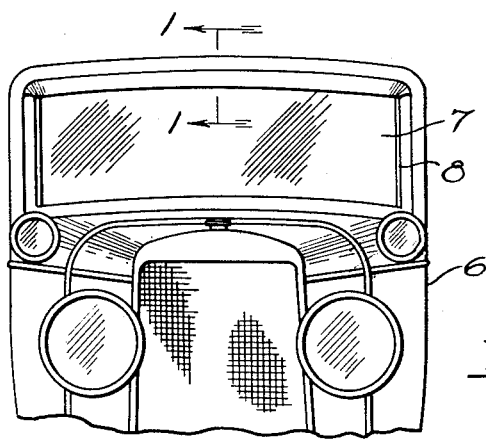
Fig. 3 is a view in front elevation of a motor vehicle equipped with a windshield mounted by my improved hinge.
Figure 4:
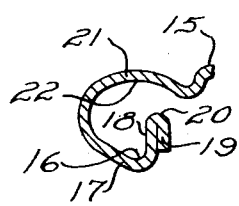
Fig. 4 is a transverse, fragmentary, sectional view of the outer hinge element.
Figure 5:
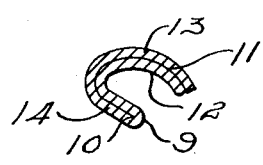
Fig. 5 is a fragmentary, transverse, sectional view of the inner hinge element.

The inner surface of the socket portion 16, straight portion 17 and arcuate portion 21 of the outer member is formed to the exact contour of the outer bearing surface 13, straight portion 14 and pivot portion 9 of the inner hinge element so that when the windshield is closed, as shown in Fig. 2 of the drawing, the entire outer surface of the inner member will be sealed metal to metal tightly against the inner surface of the outer member, thus providing an effectively sealed hinge joint.

Although but one specific embodiment of this invention has been herein shown and described, it will be understood that numerous details of the construction shown may be altered or omitted without departing from the spirit of this invention as defined by the following claims.

I claim:

1. A hinge comprising an inner member formed to provide a partially cylindrical pivot portion and complementary arcuate inner and outer bearing portions of larger radii spaced from said pivot portion and concentric therewith; and a complementary outer member having a partially cylindrical socket for reception of said pivot portion, another portion slidably engageable with said inner bearing portion and another portion slidably engageable with said outer bearing portion.

2. A hinge comprising an inner member formed to provide a partially cylindrical pivot portion and complementary arcuate inner and outer bearing portions spaced from said pivot portion and concentric therewith; and a complementary sheet metal outer member having a partially cylindrical socket for reception of said pivot portion, a terminating edge bent back upon itself to form a portion slidably engageable with said inner bearing portion and an arcuate portion slidably engageable with said outer bearing portion.

3. A hinge comprising an inner member formed to provide a partially cylindrical pivot portion, a complementary arcuate bearing portion spaced therefrom and concentric therewith and an intermediate substantially straight connecting portion disposed substantially radially with respect to the bearing portion; and a complementary outer member having a partially cylindrical socket for reception of said pivot portion, substantially straight portions diverging from said socket and another portion extending from one of said straight portions slidably engageable with said bearing portion.

4. A hinge comprising an inner member formed to provide a partially cylindrical pivot portion, complementary arcuate inner and outer bearing portions spaced from said pivot portion and concentric therewith and an intermediate substantially straight connecting portion disposed substantially radially with respect to the bearing portion; and a complementary outer member having a partially cylindrical socket for reception of said pivot portion, substantially straight portions diverging from said socket, the terminating edge of one of said straight portions being slidably engageable with said inner bearing portion, and another portion extending from the other of said straight portions for slidably engaging said outer bearing portion.

5. A hinge comprising an inner member formed to provide a partially cylindrical pivot portion, complementary arcuate inner and outer bearing portions spaced from said pivot portion and concentric therewith and an intermediate substantially straight connecting portion disposed substantially radially with respect to the bearing portion; and a complementary outer member having a partially cylindrical socket for reception of said pivot portion, substantially straight portions diverging from said socket, the terminating edge of one of said straight portions being bent back upon itself and slidably engageable with said inner bearing portion, and another portion extending from the other of said straight portions for slidably engaging said outer bearing portion.

6. In combination, a sheet metal frame member comprising spaced side walls and an intermediate portion at one edge of the walls and integrally joining them, opposite side parts of the integral joining portion being merged together and extending in bent and contacting relation to provide a hinge part, the free edge of the contacting parts being defined by a reversed bending of the metal from one part to the other to provide a curved edge face.

7. In combination, a sheet metal frame member comprising spaced side walls and an intermediate portion at one edge of the walls and integrally joining them, opposite side parts of the integral joining portion being merged together and extending in bent and contacting relation, the free edge of the contacting parts being defined by a reversed bending of the metal from one part to the other to provide a curved edge face, the opposite edges of the side walls being inwardly and reversely bent and directed between the walls and then extending toward each other to provide a channel having a base between such walls.

8. In combination, a sheet metal frame and hinge part comprising an integral sheet metal plate folded intermediate its edges into contacting and curved laminæ defining a free edge having a curved edge face effected by the reverse bending of one lamina to the other, said contacting laminæ diverging at a point substantially spaced from the free edge into spaced side walls, and the latter at their free edges being reversely bent and directed between the walls and then being bent toward each other into substantially edge contacting relation, to provide a channel having a base between the walls.

9. In combination, a sheet metal frame member comprising spaced and substantially parallel side walls having portions at one edge reversely bent between the walls and extending transversely with respect to the walls to provide a channel having a base for receiving a glass or the like, the portions of the side walls at the other edge thereof being merged together and extending in bent and substantially contacting relation to provide a hinge part, and a sheet metal portion closing the free edge of the merged portions.

ALBERT T. POTTER.